US012649574B2

(12) United States Patent
Silin et al.

(10) Patent No.: US 12,649,574 B2
(45) Date of Patent: Jun. 9, 2026

(54) ELECTRIC MOTOR COOLING SYSTEMS AND METHODS

(71) Applicant: FLIR Unmanned Aerial Systems ULC, Vancouver (CA)

(72) Inventors: Dmytro Silin, Waterloo (CA); James Infanti, Waterloo (CA); Albert Pegg, New Dundee (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 367 days.

(21) Appl. No.: 17/587,934

(22) Filed: Jan. 28, 2022

(65) Prior Publication Data

US 2023/0246513 A1     Aug. 3, 2023

(51) Int. Cl.
| | |
|---|---|
| *H02K 9/06* | (2006.01) |
| *B64C 39/02* | (2023.01) |
| *B64D 33/08* | (2006.01) |
| *H02K 5/20* | (2006.01) |
| *B64U 10/13* | (2023.01) |
| *B64U 30/20* | (2023.01) |
| *B64U 50/19* | (2023.01) |

(52) U.S. Cl.
CPC ............ *B64C 39/024* (2013.01); *B64D 33/08* (2013.01); *H02K 5/207* (2021.01); *H02K 9/06* (2013.01); *B64U 10/13* (2023.01); *B64U 30/20* (2023.01); *B64U 50/19* (2023.01); *H02K 2205/09* (2013.01)

(58) Field of Classification Search
CPC ...... H02K 9/06; H02K 2205/09; H02K 5/207; B64D 27/24; B64U 5/19; B64U 30/20; B64U 10/13; B64U 50/19
See application file for complete search history.

(56) References Cited

U.S. PATENT DOCUMENTS

| | | | |
|---|---|---|---|
| 7,675,209 B2 | 3/2010 | Masoudipour et al. | |
| 2020/0412204 A1* | 12/2020 | Ogasawara | .............. H02K 9/14 |
| 2021/0013777 A1 | 1/2021 | Bei et al. | |
| 2021/0167658 A1* | 6/2021 | Hanaoka | .............. H02K 1/2791 |

FOREIGN PATENT DOCUMENTS

| | | | | |
|---|---|---|---|---|
| CN | 211606268 | | 9/2020 | |
| CN | 211880244 | | 11/2020 | |
| DE | 102015220340 | | 5/2016 | |
| KR | 20160121937 | A * | 10/2016 | |
| WO | WO2008103129 | | 8/2008 | |
| WO | WO-2020195004 | A1 * | 10/2020 | |

OTHER PUBLICATIONS

Lee (KR 20160121937 A) English Translation (Year: 2016).*
Matsuda (WO 2020195004 A1) English Translation (Year: 2020).*
T-Motor: The Safer Propulsion System, U13II KV130, retrieved from https://store.tmotor.com/goods.php?id=767 on Jan. 6, 2021.

* cited by examiner

*Primary Examiner* — Tulsidas C Patel
*Assistant Examiner* — Robert E Mates
(74) *Attorney, Agent, or Firm* — Haynes and Boone, LLP

(57) ABSTRACT

Techniques for cooling electric motors are disclosed. In one embodiment, a system is provided. The system may include a cooling ring configured to couple to an electric motor of a UAV. The cooling ring may have a circular structure comprising a plurality of air ducts disposed therein. The structure may define an interior cavity. The air ducts may be configured to pass heated air from the interior cavity to an external environment to cool the electric motor. Additional systems and methods are also disclosed.

18 Claims, 10 Drawing Sheets

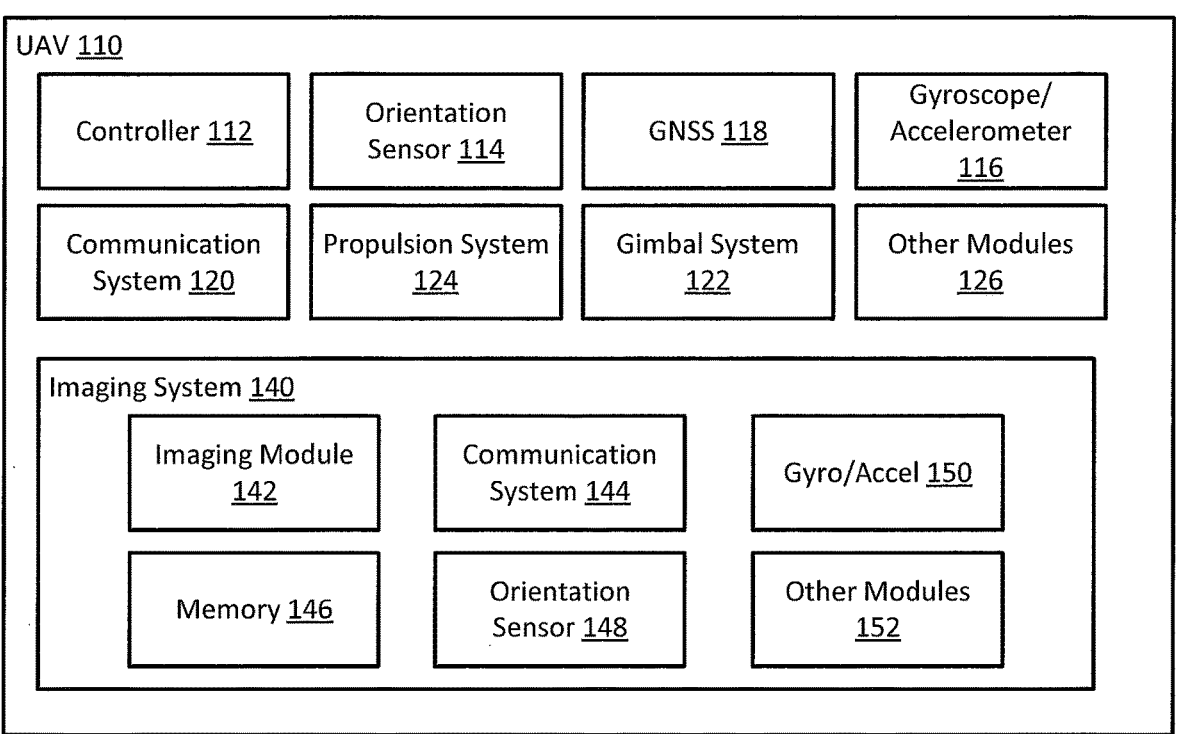
Fig. 1
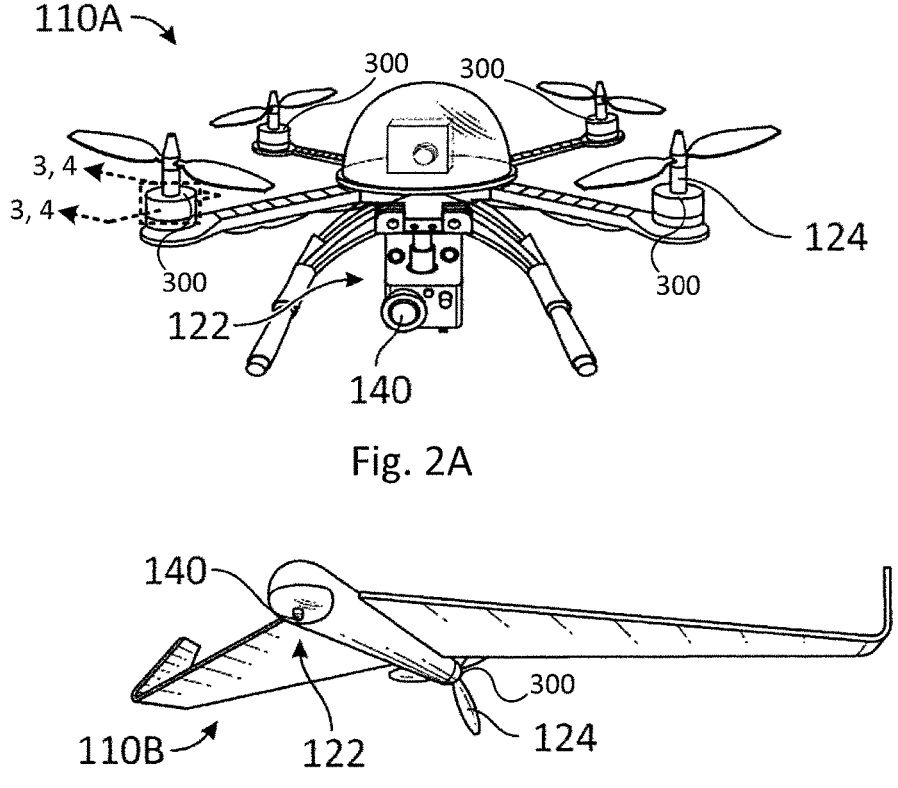
Fig. 2A
Fig. 2B

1400

Couple cooling ring to electric motor and propeller          1402

Activate electric motor          1404

Capture heated air exuded by electric motor using cooling ring          1406

Direct heated air through plurality of air ducts of cooling ring          1408

Cool electric motor          1410

ELECTRIC MOTOR COOLING SYSTEMS AND METHODS

TECHNICAL FIELD

One or more embodiments relate generally to electric motors and more particularly, for example, to systems and methods for cooling electric motors for unmanned aerial vehicles (UAVs).

BACKGROUND

Electrically powered aircraft, and particularly multi-rotor aircraft, have become popular in recent years. Unmanned versions of such aircraft (e.g., UAVs) are used in photography, video surveillance, package delivery, agriculture monitoring, reconnaissance, exploration, transportation, and many other applications. In both manned and unmanned aircraft, there is a constant demand to widen the flight envelope to extreme altitudes and temperatures. To meet such demands and reduce overheating concerns, thermal management techniques must be improved. Thus, the present disclosure provides solutions for improved cooling of electric motors, controllers, and other devices.

SUMMARY

Various techniques related to cooling electric motors and other devices are disclosed herein. In one embodiment, a cooling system for a UAV is provided. The system may include a cooling ring configured to couple to an electric motor of the UAV. The cooling ring may have a circular structure comprising a plurality of air ducts disposed therein. The structure may define an interior cavity configured to receive heated air passed by the electric motor. The air ducts may be configured to pass the air from the interior cavity to an external environment to cool the electric motor.

In another embodiment, a method for cooling an electric motor for a UAV is provided. The method may include activating the electric motor to generate a thrust for the UAV via a rotation of a propeller. The method may further include capturing heated air passed by the electric motor using a cooling ring and directing the heated air through a plurality of air duct, disposed in the cooling ring, and into an external environment to increase an air flow rate through the electric motor to cool the electric motor.

The scope of the invention is defined by the claims, which are incorporated into this section by reference. A more complete understanding of further embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 illustrates a block diagram of a UAV in accordance with one or more embodiments of the present disclosure.

FIGS. 2A and 2B illustrate diagrams of example UAVs in accordance with one or more embodiments of the present disclosure.

Figure 3:
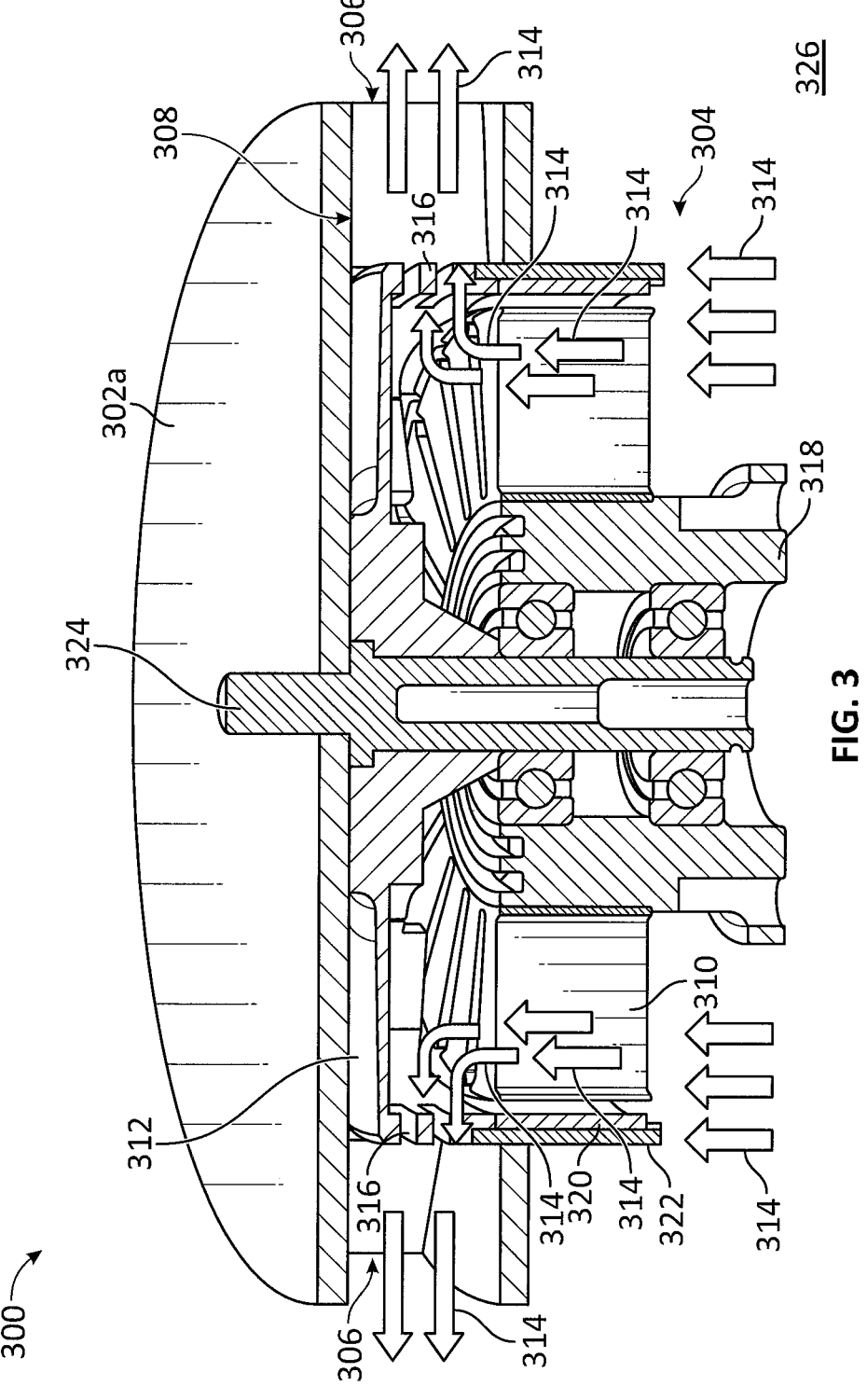
FIG. 3 illustrates a cross-sectional view of a cooling system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

It is rare for UAV designers and pilots to have the means or expertise to design a high-performance electric motor and controller. Therefore, the general practice has been to find the best readily available controller-motor-propeller combination for a particular case. Off-the-shelf motors are designed to operate in a certain range of environmental conditions and supply voltage. A list of propellers is usually recommended for each off-the-shelf motor. A controller is typically selected to match motor maximum power. Commercially available controller-motor-propeller solutions overall provide high performance. However, there are scenarios where additional cooling is required to increase performance.

For example, one scenario in which additional cooling may be required is when a UAV needs to be flown in extremely high ambient temperatures. In such a scenario, motors and controllers can easily overheat. Another example scenario in which additional cooling may be required is during a mission in which a UAV must carry an extra heavy payload. Although the mission may appear doable at cooler temperatures (e.g., negative temperatures), motors and controllers can overheat on a warm day.

Another example scenario in which additional cooling may be required is when a custom design of a UAV requires a controller to be disposed under a motor as this may cause the controller to overheat due to proximity to the motor. A further example in which additional cooling may be desired is when overcooling is used for testing. For example, extra cooling would allow a motor to take more electric power during testing. When the motor is safe from overheating, other components of a power train can be tested under higher power. Additional cooling may also be desired when other electric components of a UAV require additional air flow for better cooling.

Thus, the present disclosure provides devices, systems, and methods for improved cooling for electric motors, controllers, and other devices. In one embodiment of the present disclosure, a cooling system for a UAV is provided. The cooling system may include a cooling ring configured to couple to an electric motor of the UAV. The cooling ring may have a circular structure comprising a plurality of blades disposed between upper and lower frames. The blades along with the upper and lower frames may define a plurality of air ducts disposed in the structure of the cooling ring. As the electric motor operates, air from an external environment is pulled into the electric motor, passes over a stator with windings and magnets, and is dissipated through cooling vents of the electric motor. The air ducts of the cooling ring may align with the cooling vents of the electric motor such that the air passing through the electric motor is directed into the air ducts and back into the external environment in a radial direction. The cooling ring may be coupled to the electric motor such that when the electric motor is activated to rotate a corresponding propeller attached thereto, the cooling ring will also rotate. As the cooling ring rotates, the air flow rate through the electric motor increases, which enhances the cooling effect for the electric motor.

Referring to FIG. 1, illustrated is a block diagram of a UAV 110, in accordance with one or more embodiments of the present disclosure. In various implementations, UAV 110 may be configured to fly over a scene or survey area, to fly through a structure, or to approach a target and image or sense the scene, structure, or target, or portions thereof, using gimbal system 122 to aim imaging system/sensor payload 140 at the scene, structure, or target, or portions thereof, for example. Resulting imagery and/or other sensor data may be processed (e.g., by controller 112) and displayed to a user through use of user interface at a base station (e.g., one or more displays such as a multi-function display (MFD), a portable electronic device such as a tablet, laptop, or smart phone, or other appropriate interface) and/or stored in memory for later viewing and/or analysis. In some embodiments, UAV 110 may be configured to use such imagery and/or sensor data to control operation of UAV 110 and/or imaging system 140, such as controlling gimbal system 122 to aim imaging system 140 towards a particular direction, or controlling propulsion system 124 to move UAV 110 to a desired position in a scene or structure or relative to a target.

In some embodiments, UAV 110 may be implemented as a mobile platform configured to move or fly and position and/or aim imaging system 140 (e.g., relative to a selected, designated, or detected target). As shown in FIG. 1, UAV 110 may include one or more of a controller 112, an orientation sensor 114, a gyroscope/accelerometer 116, a global navigation satellite system (GNSS) 118, a communication system 120, a gimbal system 122, a propulsion system 124, and other modules 126. Operation of UAV 110 may be substantially autonomous and/or partially or completely controlled by a base station, which may include one or more of a user interface, a communication system, and other modules. Imaging system 140 may be physically coupled to UAV 110 and configured to capture sensor data (e.g., visible spectrum images, infrared images, narrow aperture radar data, and/or other sensor data) of a target position, area, and/or object(s) as selected and/or framed by operation of UAV 110 and/or the base station.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 including its components. Such software instructions may also implement methods for processing infrared images and/or other sensor signals, determining sensor information, providing user feedback (e.g., through the base station), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of UAV 110 or the base station. For example, controller 112 may be adapted to store sensor signals, sensor information, parameters for coordinate frame transformations, calibration parameters, sets of calibration points, and/or other operational parameters, over time, for example, and provide such stored data to a user operating the base station.

In some embodiments, controller 112 may be configured to substantially continuously monitor and/or store the status of and/or sensor data provided by one or more elements of UAV 110, imaging system 140, and/or the base station, such as the position and/or orientation of UAV 110, imaging system 140, and/or the base station, for example.

Orientation sensor 114 may be implemented as one or more of a compass, float, accelerometer, and/or other device capable of measuring an orientation of UAV 110 (e.g., magnitude and direction of roll, pitch, and/or yaw, relative to one or more reference orientations such as gravity and/or Magnetic North), gimbal system 122, imaging system 140, and/or other elements of UAV 110, and providing such measurements as sensor signals and/or data that may be communicated to various devices of UAV 110 or the base station.

Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of UAV 110 and/or other elements of system 100 and providing such measurements as sensor signals and/or data that may be communicated to other devices of UAV 110 (e.g., controller 112) or the base station. GNSS 118 may be implemented according to any global navigation satellite system, including a GPS, GLONASS, and/or Galileo based receiver and/or other device capable of determining absolute and/or relative position of UAV 110 (e.g., or an element of UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of UAV 110 or the base station. In some embodiments, GNSS 118 may include an altimeter, for example, or may be used to provide an absolute altitude.

Communication system 120 may be implemented as any wired and/or wireless communications system configured to transmit and receive analog and/or digital signals between UAV 110 and the base station. For example, communication system 120 may be configured to receive flight control signals and/or data (e.g., commands) from a communication system of the base station. In other embodiments, communication system 120 may be configured to receive images and/or other sensor information (e.g., visible spectrum and/or infrared still images or video images) from imaging system 140 and relay the sensor data to controller 112 and/or the base station. In some embodiments, communication system 120 may be configured to support spread spectrum transmissions, for example, and/or multiple simultaneous communications channels between UAV 110 and the base station. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between devices of UAV 110 and UAV 110 and the base station substantially continuously, where such data includes various types of sensor data, control parameters, and/or other data, as described herein.

Gimbal system 122 may be implemented as an actuated gimbal mount, for example, that may be controlled by controller 112 to stabilize imaging system 140 relative to a target or to aim imaging system 140 according to a desired direction and/or relative orientation or position. For example, controller 112 may receive a control signal from one or more components of UAV 110 or the base station to cause gimbal system 122 to adjust a position of imaging system 140. As such, gimbal system 122 may be configured to provide a relative orientation of imaging system 140 (e.g., relative to an orientation of UAV 110) to controller 112 and/or communication system 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/imaging system 140. In further embodiments, gimbal system 122 may be configured to couple to a laser pointer, range finder, and/or other device, for example, to support, stabilize, power, and/or aim multiple devices (e.g., imaging system 140 and one or more other devices) substantially simultaneously.

In some embodiments, gimbal system 122 may be adapted to rotate imaging system 140+-90 degrees, or up to 360 degrees, in a vertical plane relative to an orientation and/or position of UAV 110. In further embodiments, gimbal system 122 may rotate imaging system 140 to be parallel to a longitudinal axis or a lateral axis of UAV 110 as UAV 110 yaws, which may provide 360 degree ranging and/or imaging in a horizontal plane relative to UAV 110. In various embodiments, controller 112 may be configured to monitor an orientation of gimbal system 122 and/or imaging system 140 relative to UAV 110, for example, or an absolute or relative orientation of an element of imaging system 140

(e.g., imaging module 142). Such orientation data may be transmitted to other elements of UAV 110 for monitoring, storage, further processing, and/or communicating to the base station.

Propulsion system 124 may be implemented as one or more propellers, turbines, or other thrust-based propulsion systems, and/or other types of propulsion systems that can be used to provide motive force and/or lift to UAV 110 and/or to steer UAV 110. In some embodiments, propulsion system 124 may include multiple propellers (e.g., a tri, quad, hex, oct, or other type "copter") that can be controlled (e.g., by controller 112 sending a control signal to a motor physically coupled to the propeller) to provide lift and motion for UAV 110 and to provide an orientation for UAV 110. In other embodiments, propulsion system 124 may be configured primarily to provide thrust while other structures of UAV 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used in conjunction with other devices of UAV 110 (e.g., controller 112) to provide operational control of UAV 110.

In some embodiments, other modules 126 may include one or more actuated and/or articulated devices (e.g., multi-spectrum active illuminators, visible and/or IR cameras, radars, sonars, and/or other actuated devices) coupled to UAV 110, where each actuated device includes one or more actuators adapted to adjust an orientation of the device, relative to UAV 110, in response to one or more control signals (e.g., provided by controller 112). In particular, other modules 126 may include a stereo vision system configured to provide image data that may be used to calculate or estimate a position of UAV 110, for example, or to calculate or estimate a relative position of a navigational hazard in proximity to UAV 110. In various embodiments, controller 112 may be configured to use such proximity and/or position information to help safely pilot UAV 110 and/or monitor communication link quality with the base station.

In embodiments where imaging system 140 is implemented as an imaging device, imaging system 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communication system 144. More generally, imaging module 142 may be configured to perform any of the operations or methods described herein, at least in part, or in combination with controller 112 and/or the base station in communication with UAV 110.

In some embodiments, imaging system 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communication system 144 of imaging system 140 may be implemented as any wired and/or wireless communications module configured to transmit and receive analog and/or digital signals between elements of system 100. For example, communication system 144 may be configured to transmit infrared images from imaging module 142 to communication systems 120 or a communication of the base station. In other embodiments, communication system 144 may be configured to receive control signals (e.g., control signals directing capture, focus, selective filtering, and/or other operation of imaging system 140) from controller 112 and/or the base station. In some embodiments, communication system 144 may be configured to support spread spectrum transmissions, for example, and/or multiple simultaneous communications channels between imaging system 140, UAV 110, and the base station. In various embodiments, communication system 144 may be configured to monitor and communicate the status of an orientation of the imaging system 140. Such status information may be used, for example, to adjust the orientation of the imaging system 140 to capture images of a target.

Memory 146 may be implemented as one or more machine readable mediums and/or logic devices configured to store software instructions, sensor signals, control signals, operational parameters, calibration parameters, infrared images, and/or other data facilitating operation of UAV 110, for example, and provide it to various controller 112 and/or the base station. Memory 146 may also be implemented, at least in part, as removable memory, such as a secure digital memory card for example including an interface for such memory.

Orientation sensor 148 of imaging system 140 may be implemented similar to orientation sensor 114 or gyroscope/accelerometer 116, and/or any other device capable of measuring an orientation of imaging system 140, imaging module 142, and/or other elements of imaging system 140 (e.g., magnitude and direction of roll, pitch, and/or yaw, relative to one or more reference orientations such as gravity, Magnetic North, and/or an orientation of UAV 110) and providing such measurements as sensor signals that may be communicated to various devices of UAV 110 or the base station. Gyroscope/accelerometer (e.g., angular motion sensor) 150 of imaging system 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of imaging system 140 and/or various elements of imaging system 140 and providing such measurements as sensor signals that may be communicated to various devices of UAV 110 or the base station.

Other modules 152 of imaging system 140 may include other and/or additional sensors, actuators, communications modules/nodes, cooled or uncooled optical filters, and/or user interface devices used to provide additional environmental information associated with imaging system 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of UAV 110 (e.g., controller 112) to provide operational control of UAV 110 or to process imagery to compensate for environmental conditions.

In general, each of the elements of UAV 110 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of UAV 110 or the base station. In addition, one or more non-transitory mediums may be provided for storing machine readable instructions for loading into and execution by any logic device implemented with one or more of the devices of UAV 110. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of UAV 110 may include one or more modules supporting wired, wireless, and/or a combination of wired and wireless communication techniques. In some embodiments, various elements or portions of elements of UAV 110 may be integrated with each other, for example, or may be integrated onto a single printed circuit board (PCB) to reduce system complexity, manufacturing costs, power requirements, coordinate frame errors, and/or timing errors between the various sensor measurements. Each element of UAV 110 may include one or more batteries, capacitors, or other electrical power storage devices, for example, and may include one or more solar cell modules or other electrical power generating devices. In some embodiments, one or more of the devices may be powered by a power source for UAV 110, using one or more power leads. Such power leads may also be used to support one or more communication techniques discussed herein.

FIGS. 2A and 2B illustrate diagrams of example UAVs 110A and 110B, respectively, each with imaging systems 140 and associated gimbal systems 122 in accordance with one or more embodiments of the present disclosure. UAV 110A with articulated imaging system 140 and gimbal system 122, and UAV 110B with articulated imaging system 140 and gimbal system 122, in some embodiments, may be in communication with a base station configured to control motion, position, and/or orientation of UAV 110A, UAV 110B, and/or imaging systems 140. In some embodiments, UAVs 110, 110A, and/or 110B may be nodes participating in a mesh network, in some cases along with additional nodes, such as UAVs and base stations, of the mesh network. The nodes of the mesh network may exchange information about their respective positions with neighboring nodes. In some embodiments, the nodes may exchange information about their respective positions with neighboring nodes in accordance with a Cursor-on-Target (CoT) communication protocol. In further embodiments, the position information shared between nodes may include GPS coordinate positions for the respective nodes. UAVs 110, 110A, and 110B may include a cooling system 300 as further described below.

FIG. 3 illustrates a cross-sectional view of a cooling system 300 of FIG. 2A, as seen along the lines of the section 3,4-3,4 taken therein. Cooling system 300 may be implemented in a propulsion system (e.g., propulsion system 124) of a UAV (e.g., UAV 110, UAV 110A, and UAV 110B). Cooling system 300 may include a cooling ring 302a configured to selectively couple to an electric motor 304. For example, cooling ring 302a may be installed on electric motor 304 at times when more power output is desired from electric motor 304, and thus enhanced cooling is needed. At other times, cooling ring 302a may be removed from electric motor 304 to reduce weight for UAV 110.

Cooling ring 302a may have a circular structure as shown in FIG. 3, however, other shapes for the structure of cooling ring 302a are contemplated. Cooling ring 302a may include a plurality of air ducts, which may be disposed in the structure of cooling ring 302. Two of said air ducts are depicted in FIG. 3 as air ducts 306. The structure of cooling ring 302a may be configured to receive a portion of electric motor 304 within an interior cavity 308 defined by the structure.

In some embodiments, cooling ring 302a may include an interface to securely install to electric motor 304. For example, cooling ring 302a may include pins that interface with a socket of electric motor 304 and/or cooling ring 302a may include a socket that interfaces with pins of electric motor 304. For example, one or more pins may be disposed on the structure of cooling ring 302a within the interior cavity 308 to interface with a socket located on a rotor 312 of electric motor 304 or a housing for electric motor 304. Various combinations of pin and socket interfaces between cooling ring 302a and electric motor 304 may be implemented.

Electric motor 304 may be implemented as an outrunner type of electric motor. An outrunner type of electric motor 304 may include a stator 310 and rotor 312. Stator 310 may comprise a stack of laminations and windings. Stator 310 may be located inside of rotor 312. Rotor 312 may be an assembly of components including a center hub 318, magnets 320, and an iron ring 322. When electric motor 304 is activated to generate thrust for UAV 110 (e.g., by rotating a corresponding propeller), electricity is passed through stator 310 to create a magnetic field in rotor 312 that attracts and repels magnets 320 in rotor 312 to cause/drive rotation of rotor 312, and consequently a propeller physically coupled to rotor 312 via a rotor shaft 324 (propeller not shown in FIG. 3).

During operation of electric motor 304, air 314 collected from an external environment 326 of electric motor 304 enters electric motor 304 from openings in a bottom of a housing of electric motor 304 and/or rotor 312, passes through heated windings and magnets of electric motor 304, and exits rotor 312 in a radial direction through air vents 316 (e.g., slots, apertures, etc.) disposed in rotor 312. The air 314 may be captured by cooling ring 302a and directed through air ducts 306 back into external environment 326 in a radial direction. The rotation of cooling ring 302a may increase the flow rate of air 314 through electric motor 304, and thus may enhance cooling for electric motor 304 and, in some cases, periphery devices, such as a motor controller that may be coupled to electric motor 304.

Figure 4:
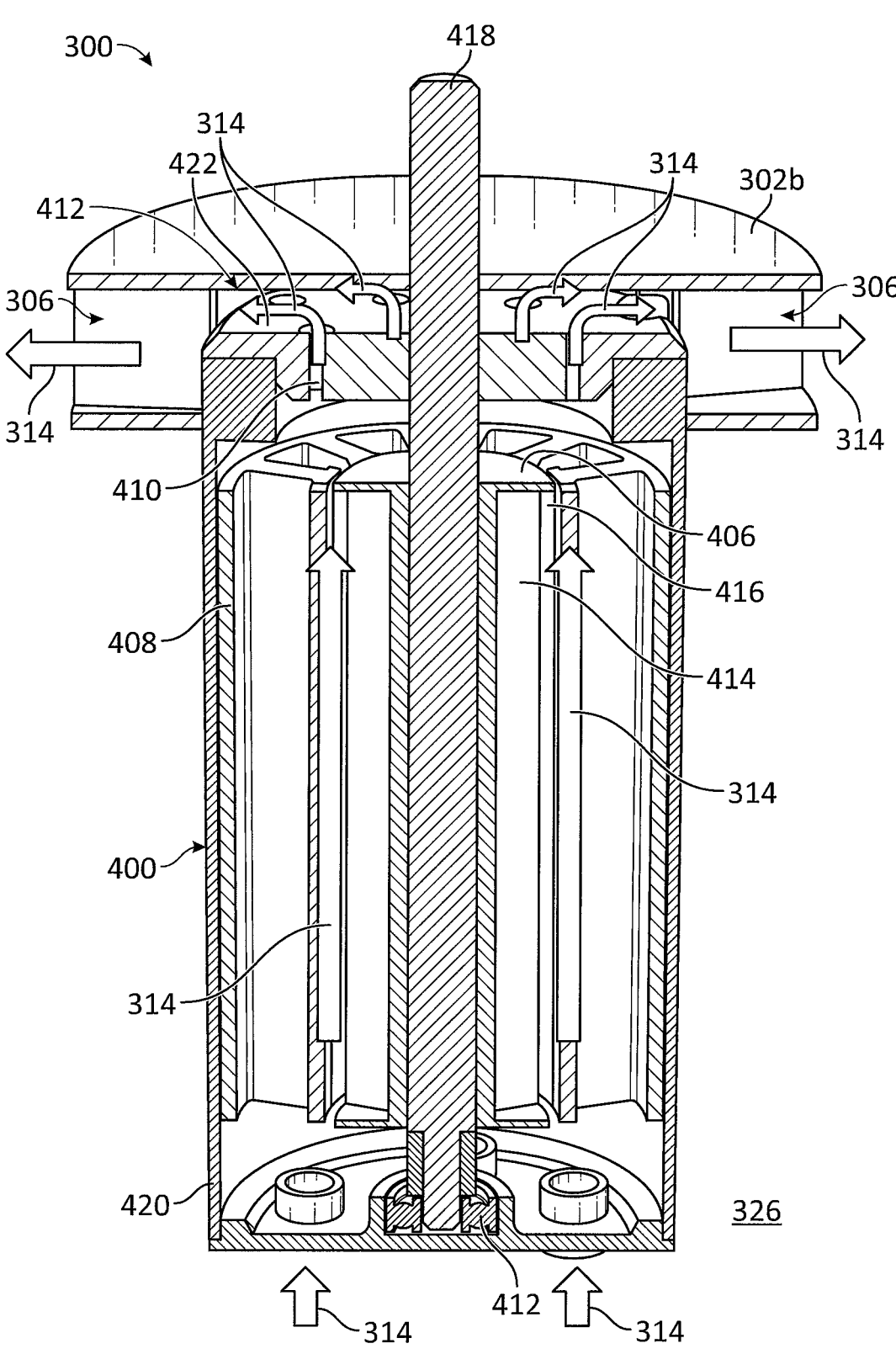
FIG. 4 illustrates a cross-sectional view of a cooling system in accordance with one or more embodiments of the present disclosure.

FIG. 4 illustrates a cross-sectional view of an embodiment of cooling system 300 of FIG. 3, as seen along the lines of the section 3,4-3,4 taken therein. In an embodiment shown in FIG. 4, cooling system 300 includes a cooling ring 302b installed on an electric motor 400 implemented as an inrunner type of electric motor. Electric motor 400, as an inrunner type of electric motor, has a rotor 406 located inside of a stator 408. Stator 408 may comprise a stack of laminations and windings. Rotor 406 may be an assembly including a center hub 402, magnets 414, and an iron ring 416. When electric motor 400 is activated to generate thrust for UAV 110, electricity is passed through stator 408 to create a magnetic field in rotor 406, which attracts and repels the magnets 414 in rotor 406 to cause/drive rotation of rotor 406 and consequently a rotor shaft 418 coupled to rotor 406. A propeller may be attached to rotor shaft 418 (and rotor 406) so that the propeller rotates with rotor 406 via rotor shaft 418. Cooling ring 302b may be installed between electric motor 400 and a propeller (propeller not shown in FIG. 4) and may be secured at least partially by an interface between electric motor 400 and the propeller. Cooling ring 302b may rotate along with rotor 406 and the propeller.

During operation of electric motor 400, air 314 may enter electric motor 400 from external environment 326 of electric motor 400, such as through air intake holes in a housing 420 for electric motor 304. Air 314 then passes through heated windings and magnets of electric motor 400 and exits through air vents (e.g., air vent 410) defined in a surface 422 of housing 420. The heated air 314 is captured in an interior cavity 412 defined by the structure of cooling ring 302b. Electric motor 400 may be partially disposed in interior cavity 412 when cooling ring 302b is coupled to electric motor 400. Operation of electric motor 400 may cause/drive rotation of rotor 406, rotor shaft 418, a propeller attached to rotor shaft 418 (propeller not shown in FIG. 4), and cooling ring 302b. The rotation of cooling ring 302b may increase the air flow rate through electric motor 400, and thus enhance cooling for electric motor 400 and, in some cases, periphery devices, such as a motor controller in proximity to electric motor 400.

Figure 5:
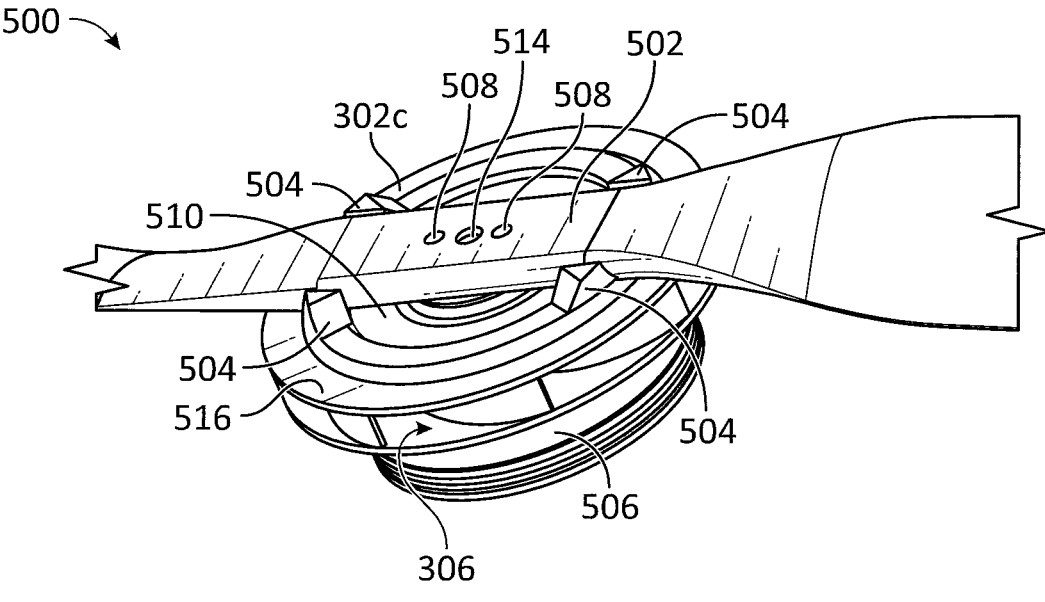
FIG. 5 illustrates an assembled view of a cooling system in accordance with one or more embodiments of the present disclosure.
Figure 6:
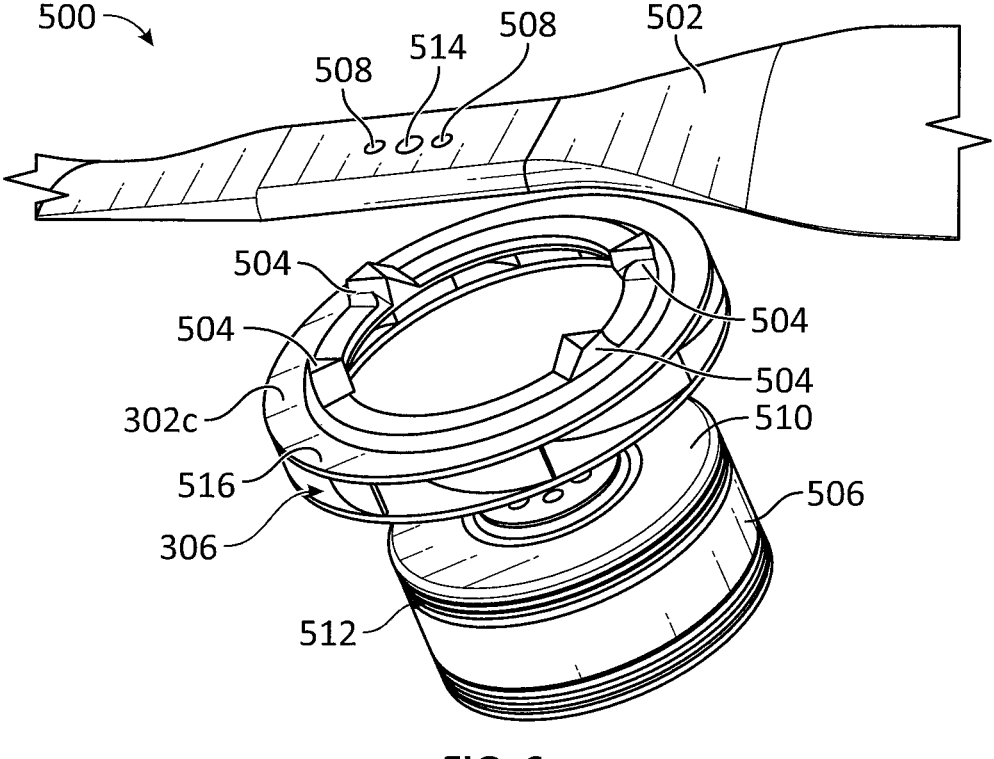
FIG. 6 illustrates an exploded view of the cooling system shown in FIG. 5.

FIG. 5 illustrates an assembled view of a cooling system 500 in accordance with one or more embodiments of the present disclosure. FIG. 6 illustrates an exploded view of cooling system 500 of FIG. 5. In the embodiment shown in FIGS. 5 and 6, cooling system 500 includes an electric motor 506, a cooling ring 302c, and a propeller 502. In some embodiments, cooling system 500 may be one of a plurality of cooling systems implemented on each electric motor in propulsion system 124 of UAV 110.

Cooling ring 302*c* may be installed onto electric motor 506. For example, cooling ring 302*c* may be installed directly onto a rotor 510 of electric motor 506. Cooling ring 302*c* may have tabs 504 (e.g., features, elements, prongs, protrusions, etc.) disposed on an upper frame 516 of cooling ring 302*c*. Tabs 504 may be configured to receive propeller 502. Tabs 504 may assist in aligning cooling ring 302*c* with respect to propeller 502 and vice versa. Fasteners may be inserted into through-holes 508 of propeller 502 and into electric motor 506 to clamp cooling ring 302*c* and propeller 502 to electric motor 506. A rotor shaft (e.g., rotor shaft 324, rotor shaft 418) may insert into interface 514 of propeller 502 to connect propeller 502 to rotor 510. Tabs 504 and the interface between propeller 502 and electric motor 506 may secure and align cooling ring 302*c* with a fixed position relative to propeller 502 and electric motor 506 such that cooling ring 302*c*'s air ducts (e.g., air duct 306) aligns with air vents 512 located around the skirt of rotor 510.

When propeller 502 is rotated by operation of electric motor 506, cooling ring 302*c* will also rotate to increase the flow rate of air through electric motor 506. The increase in the flow rate of air through electric motor 506 may enhance cooling for electric motor 506 and, in some cases, periphery devices.

Figure 7:
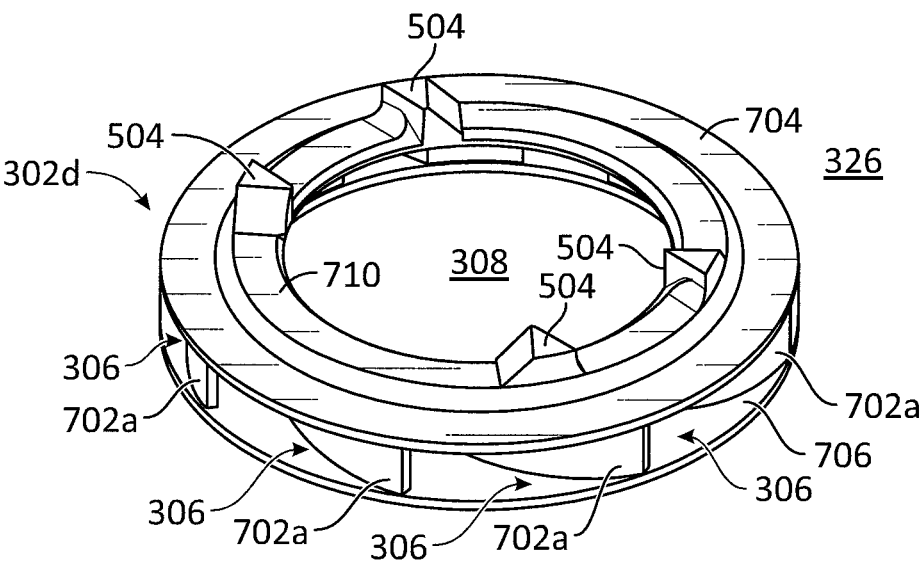
FIG. 7 illustrates a perspective view of a cooling ring in accordance with one or more embodiments of the present disclosure.

FIG. 7 illustrates a perspective view of a cooling ring 302*d* in accordance with one or more embodiments of the present disclosure. In an embodiment shown in FIG. 7, the structure of cooling ring 302*d* has an upper circular frame 704 and a lower circular frame 706. A plurality of blades 702*a* may be disposed between upper circular frame 704 and lower circular frame 706. In some embodiments, upper circular frame 704, lower circular frame 706, and blades 702*a* may be a unified structure. In other embodiments, one or more of upper circular frame 704, lower circular frame 706, and/or blades 702*a* may be separate components that can be assembled to form cooling ring 302*d*.

Blades 702*a*, along with upper circular frame 704 and lower circular frame 706, may define air ducts 306. Blades 702*a* may be curved to smooth air flow. Blades 702*a* may extend from interior cavity 308 of cooling ring 302*d* to external environment 326. Thus, the air ducts 306 defined by blades 702*a* may allow for air captured in interior cavity 308 to flow from interior cavity 308 to external environment 326 to cool an electric motor as discussed herein.

In the embodiment shown in FIG. 7, interior cavity 308 has a hollow bore, however, in other embodiments, interior cavity 308 may be a mostly sealed/closed cavity with accommodating through-holes to allow for a propeller to interface with an electric motor through cooling ring 302*d*. Interior cavity 308 may be defined at least in part by a lip 710 disposed on upper circular frame 704, which may assist in securing cooling ring 302*d* to an electric motor and preventing the electric motor from sliding through cooling ring 302*d*. For example, an underside of lip 710 may rest on a portion of an electric motor that is partially placed into interior cavity 308. Cooling ring 302*d* may be installed on an electric motor such that air ducts 306 align with corresponding air vents of the electric motor. Lip 710 may be raised such that tabs 504 disposed on lip 710 have clearance for a propeller connected to cooling ring 302*d* via tabs 504.

Figure 8:
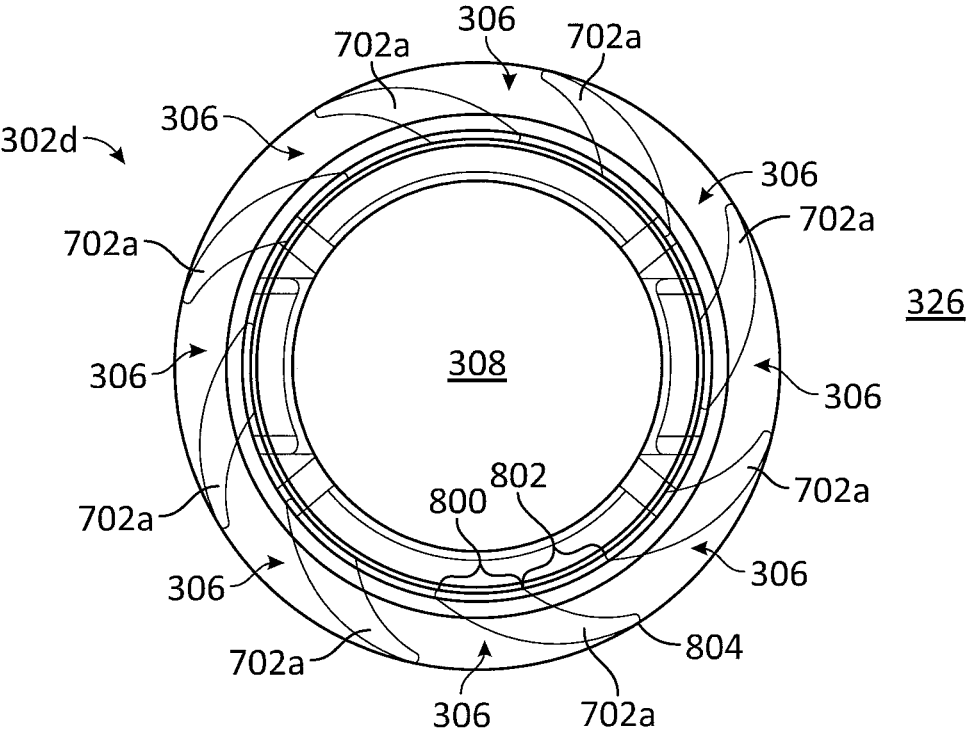
FIG. 8 illustrates a plan view of the cooling ring shown in FIG. 7.

FIG. 8 illustrates a plan view of cooling ring 302*d* according to an embodiment shown in FIG. 7. As shown in FIG. 8, a root of each blade (e.g., root 800) adjacent to interior cavity 308 may be thickened to cover/span a surface between an electric motor's cooling air vents so that each air vent opening matches with an opening (e.g., opening 802) to an air duct 306 of cooling ring 302*d*. In some embodiments, the root of each blade 702*a* may be thicker than an end of the blade (e.g., end of blade 804). Cooling ring 302*d* may provide for efficiency in terms of air flow generated per torque required. Cooling ring 302*d* may be directional. For example, cooling ring 302*d* may rotate in a clockwise direction to increase a flow rate of air through an electric motor to which cooling ring 302*d* is installed, thus cooling the electric motor. However, a counterclockwise variation of cooling ring 302*d* may also be required for a multi-rotor UAV.

Figure 9:
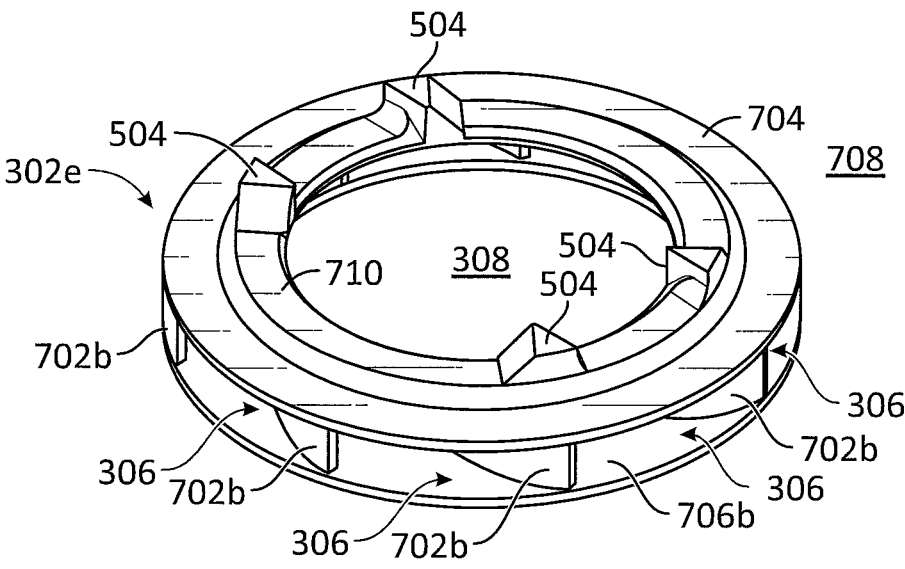
FIG. 9 illustrates a perspective view of a cooling ring in accordance with one or more embodiments of the present disclosure.
Figure 10:
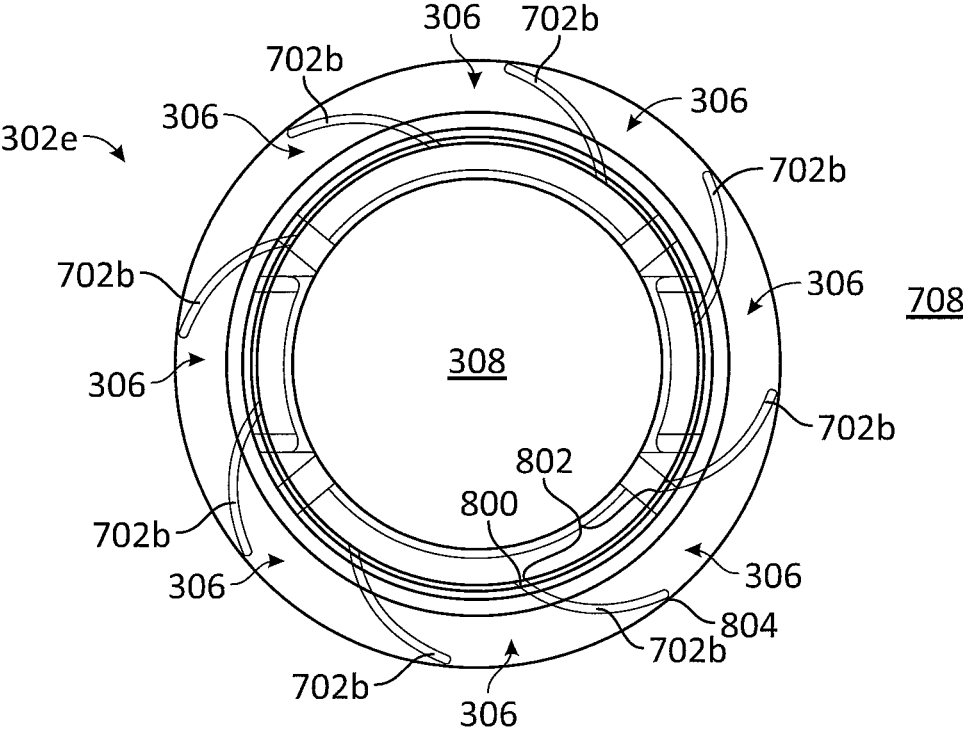
FIG. 10 illustrates a plan view of the cooling ring shown in FIG. 9.

FIG. 9 illustrates a perspective view of cooling ring 302*e* in accordance with one or more embodiments of the present disclosure. FIG. 10 illustrates a plan view of cooling ring 302*e* of FIG. 9. Cooling ring 302*e* may be similar to cooling ring 302*d* but may have curved blades 702*b* that are constant (e.g., uniform) in thickness. Using a constant thickness for blades 702*b* may simplify the manufacturing process for cooling ring 302*e* and reduce costs associated with manufacturing.

Figure 11:
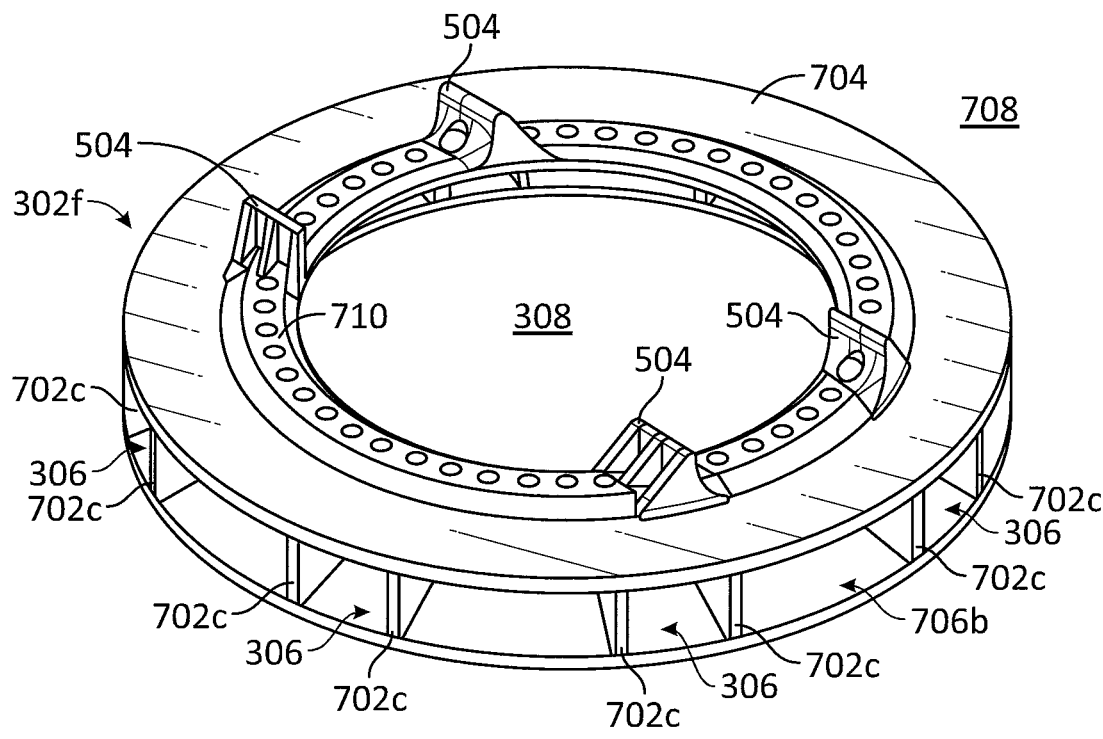
FIG. 11 illustrates a perspective view of a cooling ring in accordance with one or more embodiments of the present disclosure.
Figure 12:
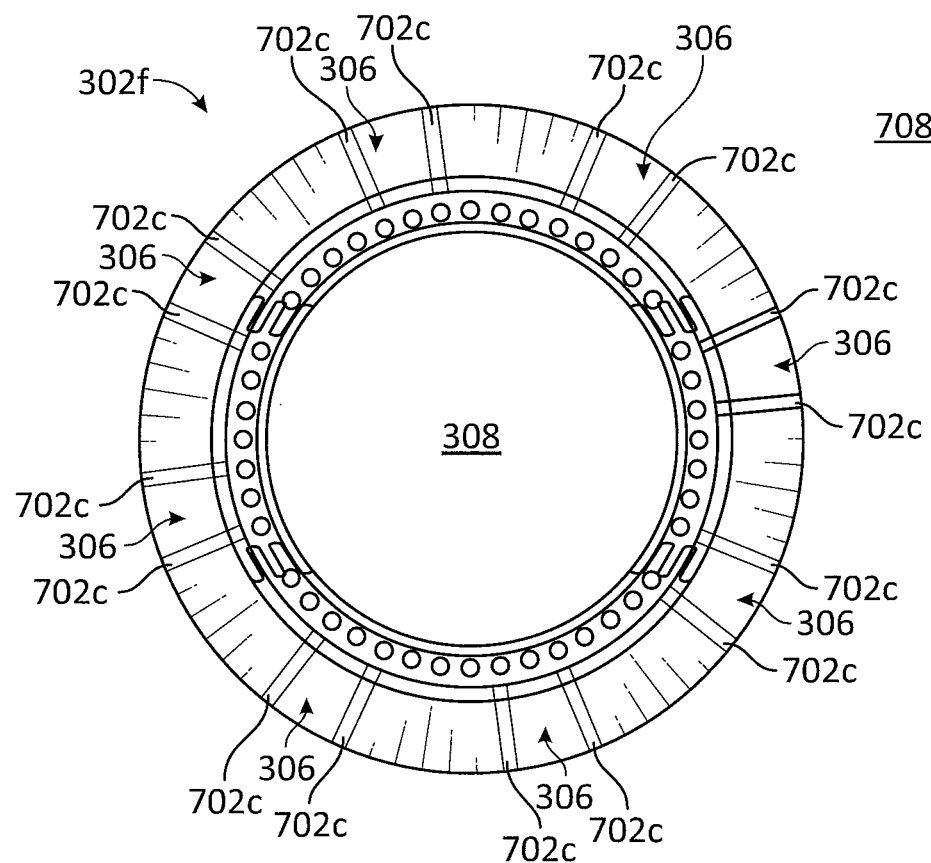
FIG. 12 illustrates a plan view of the cooling ring shown in FIG. 11.

FIG. 11 illustrates a perspective view of cooling ring 302*f* in accordance with one or more embodiments of the present disclosure. FIG. 12 illustrates a plan view of cooling ring 302*f* of FIG. 11. Cooling ring 302*f* may have straight blades 702*c*. Although straight blades 702*c* may not be as aerodynamically efficient compared to directional cooling rings with curved blades, straight blades 702*c* are omnidirectional. By using straight blades 702*c*, only one cooling ring type (e.g., cooling ring 302*f*) is needed for both clockwise and counterclockwise running electric motors, which can be more cost effective than implementing directional cooling rings. Further, straight blades 702*c* may allow for greater versatility in manufacturing methods.

Various methods may be used to manufacture cooling rings such as those discussed in the present disclosure. For example, in the case of a permanent installation, cooling vents of an electric motor may be extended in a radial direction to form air ducts. Additive technologies such as Stereolithography (SLA) or Fused Filament Fabrication (FFF) 3D printing, or sandcasting of metal may be used to manufacture cooling rings. In some embodiments, cooling rings may be assembled from sheet metal parts. In further embodiments, cooling rings can be manufactured as a combination of plastic and/or metal injection top and bottom plastic frames, and a set of sheet metal blades. Various materials may be used to form cooling rings. One example material includes polyetherketone carbon-filled heat resistant plastic.

Figure 13:
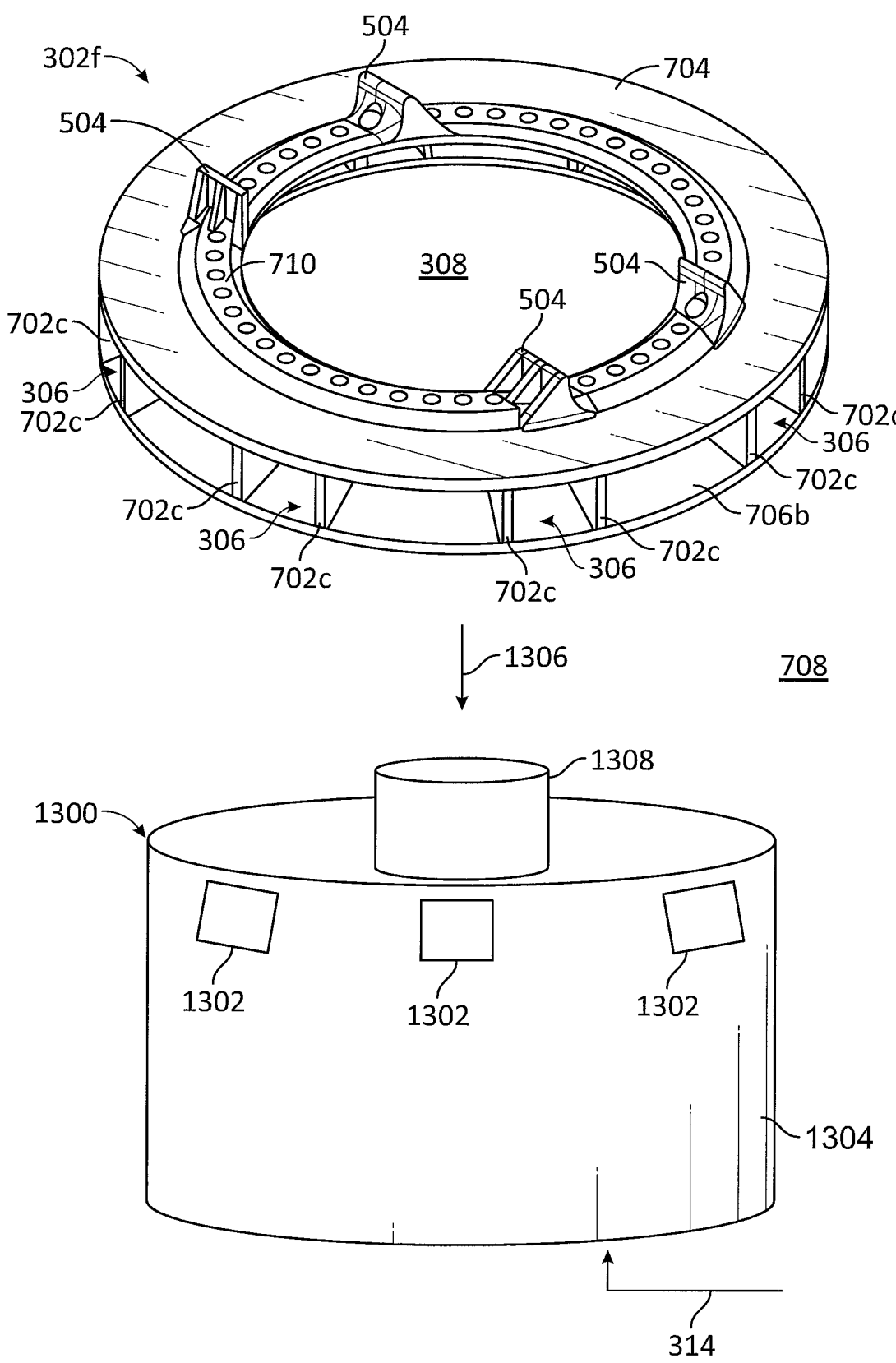
FIG. 13 illustrates a diagram for installing a cooling ring onto an electric motor in accordance with one or more embodiments of the present disclosure.

FIG. 13 illustrates a diagram for installing cooling ring 302*f* onto an electric motor 1300 in accordance with one or more embodiments of the present disclosure. Electric motor 1300 may be a brushless outrunner type of electric motor with air vents 1302 disposed on a skirt of a rotor 1304 of electric motor 1300. Air 314 may enter electric motor 1300 from the bottom, pass through heated windings and magnets, and dissipate through the air vents 1302 in a radial direction. However, cooling ring 302*f*, when installed 1306, may directed the air 314, dissipated through air vents 1302, through air ducts 306. As operation of electric motor 1300 causes rotor 1304 to rotate and consequently a propeller attached to rotor shaft 1308, cooling ring 302*f* will also rotate. Rotation of cooling ring 302*f* will cause an air flow rate through electric motor 1300 to increase, thus enhancing a cooling for electric motor 1300.

Figure 14:
FIG. 14 illustrates a flow diagram of a process for cooling electric motors and other devices of a UAV in accordance with one or more embodiments of the present disclosure.
Figure 14:
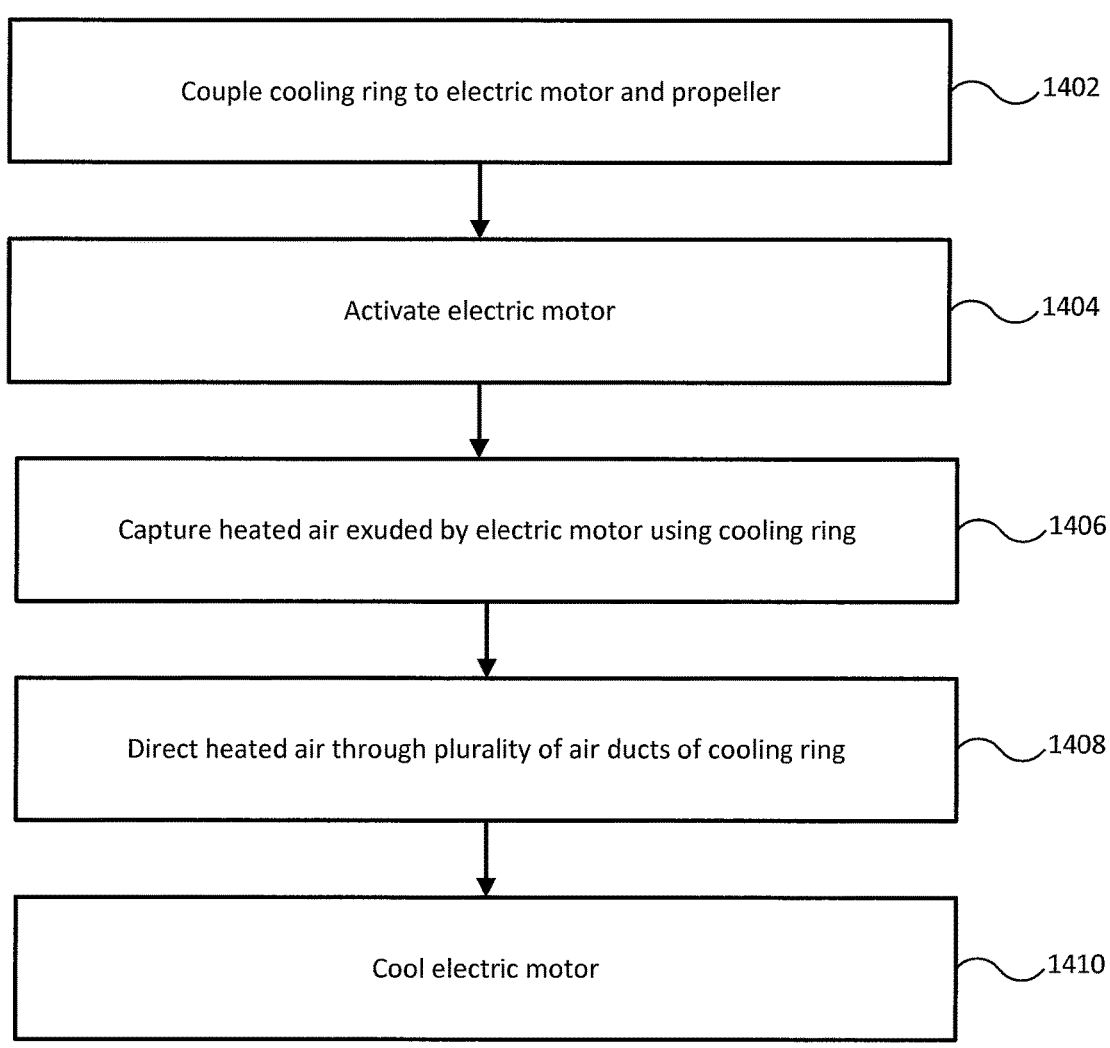

FIG. 14 illustrates a flow diagram of a process 1400 for cooling one or more electric motors of a UAV (e.g., UAV

13

110) using a cooling system in accordance with one or more embodiments of the disclosure. It should be appreciated that any step, sub-step, sub-process, or block of process 1400 may be performed in an order or arrangement different from the embodiments illustrated by FIG. 14. For example, in some embodiments, one or more blocks may be omitted from or added to process 1400. Note that in describing FIG. 14, reference may be made to FIGS. 1-13, however, it will be appreciated that embodiments of FIG. 14 are not limited by FIGS. 1-13. It will further be appreciated that although process 1400 is primarily described in reference to one electric motor and propeller, process 1400 can be performed to cool each electric motor for each propeller of a multi-rotor UAV.

Figure 15:
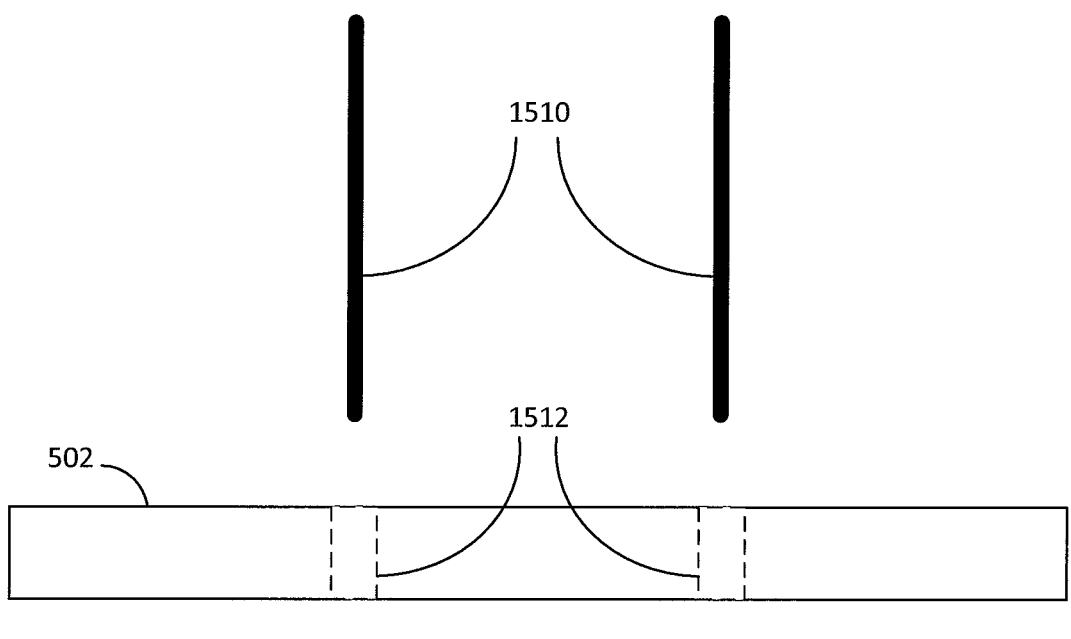
FIG. 15 illustrates an exploded schematic view of a cooling system in accordance with one or more embodiments of the present disclosure.
Figure 15:
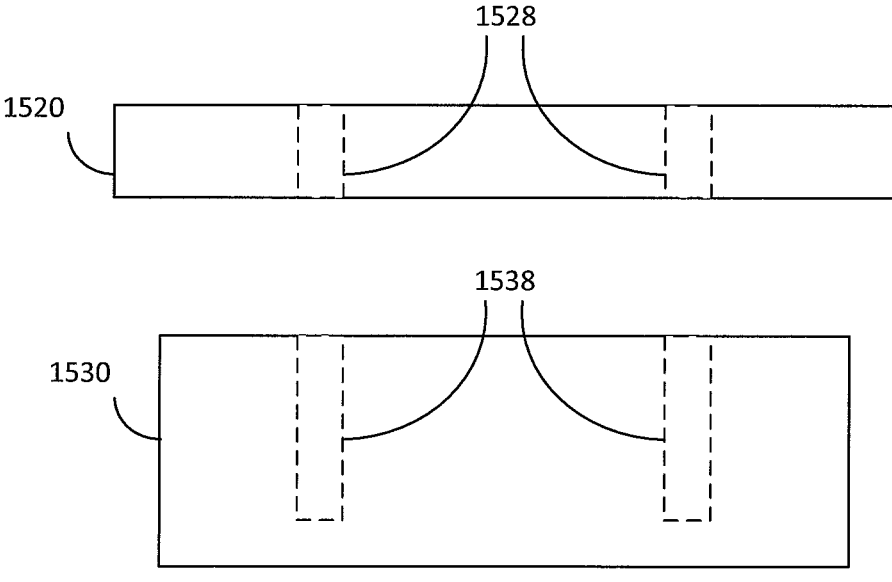

At block 1402, a cooling ring (e.g., cooling rings 302a-f) may be coupled to an electric motor (e.g., electric motor 304, electric motor 400, electric motor 506) and a propeller (e.g., propeller 502). For example, the cooling ring may be installed on the rotor of the electric motor using a cantilever snap-fit or pin and socket interface. The cooling ring may have tabs configured to receive and secure the propeller such that the cooling ring and propeller are in fixed positions relative to each other as discussed in reference to FIGS. 5 and 6. Fasteners (such as 1510 in the exploded schematic diagram of FIG. 15) may be inserted into through-holes (such as 1512 in FIG. 15 or 508 in FIG. 5) of the propeller (e.g. 502) and through-holes (e.g. 1528) of the cooling ring (e.g. 1520), or directly into through-holes (e.g. 1538) of the electric motor (e.g. 1530) if the cooling ring has a hollow bore, to clamp the cooling ring and propeller to the electric motor. The cooling ring may be configured such that when the propeller is fastened to the electric motor, the air ducts of the cooling ring align with cooling air vents disposed on the electric motor. The fasteners may be received by an interface of the rotor of the electric motor. A rotor shaft may be inserted through the cooling ring and received by an interface of the propeller such that rotation of the rotor driven by operation of the electric motor causes rotation of the cooling ring and the propeller.

At block 1404, the electric motor may be activated. For example, a controller (e.g., controller 112) may send a control signal to the electric motor to cause the electric motor to rotate the propeller. When the electric motor is activated, ambient air may be pulled from an external environment into the electric motor through an air intake. In some embodiments, the air intake may include a plurality of apertures, for example, at the bottom of the electric motor, that allow the ambient air to be pulled into the electric motor. In some embodiments, the electric motor may operate as a centrifugal fan to enhance air flow through the electric motor (e.g., drawing ambient air through the air intake and dissipating through cooling air vents). The air that flows through the electric motor may heat due to heat transfer from the electric motor components in operation.

At block 1406, the heated air passing through the electric motor may be captured by the cooling ring. For example, the heated air may be captured in an interior cavity of the cooling ring where the electric motor may be partially embedded.

At block 1408, the captured heated air may be directed through a plurality of air ducts of the cooling ring and back into the external environment in a radial direction. A centrifugal force provided by rotation of the electric motor, and consequently the cooling ring, may increase the rate of air flow from the electric motor through the air ducts and into the external environment. At block 1410, the electric motor is cooled as the air flow rate increases through the electric motor due to the rotation of the cooling ring. The enhanced cooling effect provided to the electric motor may additionally assist in cooling electric devices in proximity to the electric motor such as a motor controller for the UAV.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
an inrunner electric motor of an unmanned aerial vehicle (UAV); and
a cooling ring coupled to a rotor of the inrunner electric motor to rotate along with the rotor, the cooling ring comprising:
a circular structure comprising a plurality of air ducts disposed therein;
wherein the structure defines an interior cavity; and
wherein the air ducts are configured to pass heated air from the interior cavity to an external environment to cool the electric motor, wherein the air ducts reach radially beyond the rotor;
wherein the electric motor comprises a housing having a top surface having air vents configured to pass the heated air from inside the housing to the interior cavity;
wherein the interior cavity defined by the circular structure comprises a cylindrical hollow laterally bounded by the circular structure; and
the cylindrical hollow receives a top portion of a sidewall of the housing of the electric motor, and the air ducts pass through the cooling ring, the cooling ring surrounding the interior cavity and also surrounding the top portion of the sidewall of the housing of the electric motor.

2. The system of claim 1, wherein the cooling ring is configured to be rotated by operation of the electric motor, and the circular structure comprises a plurality of blades disposed between upper and lower circular frames, wherein the blades define the air ducts, and wherein the blades curve from the interior cavity to the external environment.

3. The system of claim 2, wherein a root of each blade adjacent to the interior cavity spans a surface of the electric motor separating each of the air vents.

4. The system of claim 2, wherein the circular structure is a unified structure comprising the upper frame, the lower frame, and the blades.

5. The system of claim 1, wherein the interior cavity is configured to receive at least a portion of the electric motor, and wherein the heated air passes through the electric motor and is dissipated through the air vents directly into the air ducts.

6. The system of claim 1, wherein the interior cavity is configured to:

receive the heated air which has entered the electric motor through openings in a rotor of the electric motor, passed through heated windings and/or magnets of the electric motor, and dissipated through the air vents of the electric motor; and direct the received heated air through the air ducts to the external environment.

7. The system of claim 1, further comprising the electric motor and a propeller configured to interface with the electric motor, wherein the cooling ring is configured to couple to the electric motor in part by the interface between the propeller and the electric motor.

8. A method comprising:

installing a cooling ring on an unmanned aerial vehicle (UAV) comprising an electric motor;

activating the electric motor to generate a thrust for the UAV, wherein the activating the electric motor causes a rotation of a propeller;

capturing heated air passed by the electric motor using the cooling ring coupled to a rotor of the electric motor and rotating along with the rotor, wherein the cooling ring comprises a circular structure defining an interior cavity and a plurality of air ducts disposed in the structure;

directing the heated air through the plurality of air ducts and into an external environment of the UAV to cool the electric motor, wherein the air ducts are positioned radially beyond the rotor; and then removing the cooling ring, and operating the UAV without the cooling ring, wherein operating the UAV without the cooling ring comprises:

activating the electric motor to generate a thrust for the UAV, wherein the activating the electric motor causes a rotation of the propeller.

9. The method of claim 8, further comprising rotating the cooling ring by the electric motor, wherein the circular structure comprises a plurality of blades disposed between upper and lower circular frames, wherein the blades define the air ducts, and wherein the blades curve from the interior cavity to the external environment.

10. The method of claim 8, wherein the interior cavity is configured to receive at least a portion of a sidewall of the electric motor, and wherein the heated air passes through the electric motor and is dissipated through air vents of the electric motor directly into the air ducts.

11. The method of claim 8, further comprising:

receiving, by the interior cavity, the heated air which has entered the electric motor through openings in a rotor of the electric motor, passed through heated windings and/or magnets of the electric motor, and dissipated through air vents of the electric motor; and directing the received heated air from the interior cavity through the air ducts to the external environment.

12. The method of claim 8, wherein the propeller is configured to interface with the electric motor, wherein the cooling ring is fastened to the electric motor in part by the interface between the propeller and the electric motor, and wherein the method further comprises:

coupling the cooling ring to the electric motor; and coupling the propeller to the electric motor using the interface and thereby fastening the cooling ring to the electric motor.

13. The method of claim 8, wherein the cooling ring further comprises a plurality of tabs configured to secure the propeller in a fixed position relative to the cooling ring, and wherein the method further comprises:

receiving the propeller using the tabs to align the propeller with the electric motor, and operating the UAV with the cooling ring coupled to the electric motor.

14. A system comprising:

a removable cooling ring configured to selectively couple to an electric motor of an unmanned aerial vehicle (UAV) operable with or without the cooling ring, the electric motor comprising a plurality of cooling vents, the cooling ring comprising:

a circular structure comprising a plurality of air ducts disposed therein and configured to receive air emerging from the cooling vents of the electric motor;

wherein the circular structure defines a circular interior cavity comprising a cylindrical hollow laterally bounded by the circular structure, the cylindrical hollow being configured to receive at least a first part of the electric motor when the cooling ring is installed on the electric motor, the first part comprising the cooling vents; and wherein the air ducts are configured to pass heated air from the cooling vents located in the cylindrical hollow to an external environment to cool the electric motor;

wherein the system further comprises:

the electric motor;

a propeller; and removable fasteners configured to fasten the propeller to the electric motor;

wherein the fasteners and the propeller are configured to clamp the cooling ring to a rotor of the electric motor when the first part of the electric motor is in the circular interior cavity; and wherein the circular interior cavity comprises a hollow bore, and the fasteners are configured to be inserted directly into the electric motor through the hollow bore.

15. The system of claim 14, wherein the electric motor comprises a housing having a top surface having air vents configured to pass the heated air from inside the housing to the circular interior cavity;

wherein the cylindrical hollow receives a top portion of a sidewall of the housing of the electric motor, and the air ducts pass through the cooling ring, the cooling ring surrounding the circular interior cavity and also surrounding the top portion of the sidewall of the housing of the electric motor.

16. The system of claim 14, wherein the cooling ring further comprises a propeller interface configured to receive and align the propeller with the electric motor, and wherein the propeller interface comprises a plurality of tabs configured to secure the propeller in a fixed position relative to the cooling ring;

wherein the cooling ring is removable, the UAV being operable without the cooling ring.

17. The system of claim 14, wherein the fasteners are configured to be inserted into holes of the propeller and holes of the cooling ring.

18. The system of claim 14, wherein the cooling ring comprises one or more alignment features configured to interface with the propeller to align the cooling ring with respect to the propeller; and wherein the fasteners clamp the propeller to the electric motor and cooperate with the alignment features to align the air ducts with the cooling vents that terminate on a side of the electric motor.

* * * * *